(12) United States Patent
Büttner et al.

(10) Patent No.: US 8,578,732 B2
(45) Date of Patent: Nov. 12, 2013

(54) COMPACT SORPTION COOLING UNIT

(75) Inventors: Thomas Büttner, Leipzig (DE); Walter Mittelbach, Freiburg (DE)

(73) Assignee: SorTech AG, Halle/Saale (DE)

( * ) Notice: Subject to any disclaimer, the term of this patent is extended or adjusted under 35 U.S.C. 154(b) by 831 days.

(21) Appl. No.: 12/450,103

(22) PCT Filed: Jan. 15, 2008

(86) PCT No.: PCT/EP2008/050355
§ 371 (c)(1),
(2), (4) Date: Jun. 4, 2010

(87) PCT Pub. No.: WO2008/110395
PCT Pub. Date: Sep. 18, 2008

(65) Prior Publication Data
US 2010/0293989 A1 Nov. 25, 2010

(30) Foreign Application Priority Data
Mar. 13, 2007 (DE) .......................... 10 2007 012 113

(51) Int. Cl.
*F25B 17/02* (2006.01)
(52) U.S. Cl.
USPC .............................................. 62/478; 62/479
(58) Field of Classification Search
USPC ................................... 62/476, 478, 479, 480
See application file for complete search history.

(56) References Cited

U.S. PATENT DOCUMENTS

| 4,199,959 A | 4/1980 | Wurm ............................. 62/480 |
| 4,581,049 A * | 4/1986 | Januschkowetz ............... 96/126 |
| 4,694,659 A * | 9/1987 | Shelton .......................... 62/106 |

(Continued)

FOREIGN PATENT DOCUMENTS

| DE | 3808653 | 3/1989 |
| DE | 199 02 695 | 7/1999 |

(Continued)

OTHER PUBLICATIONS

International Search Report (in English); Notification of Transmittal of Translation of the International Preliminary Report on Patentability; International Preliminary Report on Patentability; and translation of the Written Opinion of the International Searching Authority.

*Primary Examiner* — Mohammad M Ali
(74) *Attorney, Agent, or Firm* — Gerald T. Bodner

(57) ABSTRACT

The invention relates to a compact sorption cooling unit, comprising at least one adsorber/desorber unit (1) having a heat exchanger and sorption material, at least one condenser heat exchanger (5), and at least one evaporator heat exchanger (6), wherein these building blocks are located in a common, vacuum-tight metal outer housing, and having connection and coupling elements and pipe ducts for the hydraulic interconnection and operation of the unit. The invention provides a sandwich structure, wherein the at least one adsorber/desorber unit (1) is located in an inner or partial inner housing. The condenser heat exchanger (5) and the evaporator heat exchanger (6) are disposed at a distance from each other, and the inner housing having the adsorber/desorber unit (1) is provided in the intermediate space thereof. The separating surfaces (2) of the inner housing directed toward the condenser heat exchanger (5) and toward the evaporator heat exchanger (6) receive steam valves (8, 9). Further, a heat insulating layer (7), or a heat insulating plate, is disposed in the region between the inner housing and the evaporator heat exchanger (6).

19 Claims, 3 Drawing Sheets

(56) References Cited

U.S. PATENT DOCUMENTS

Figure 1:
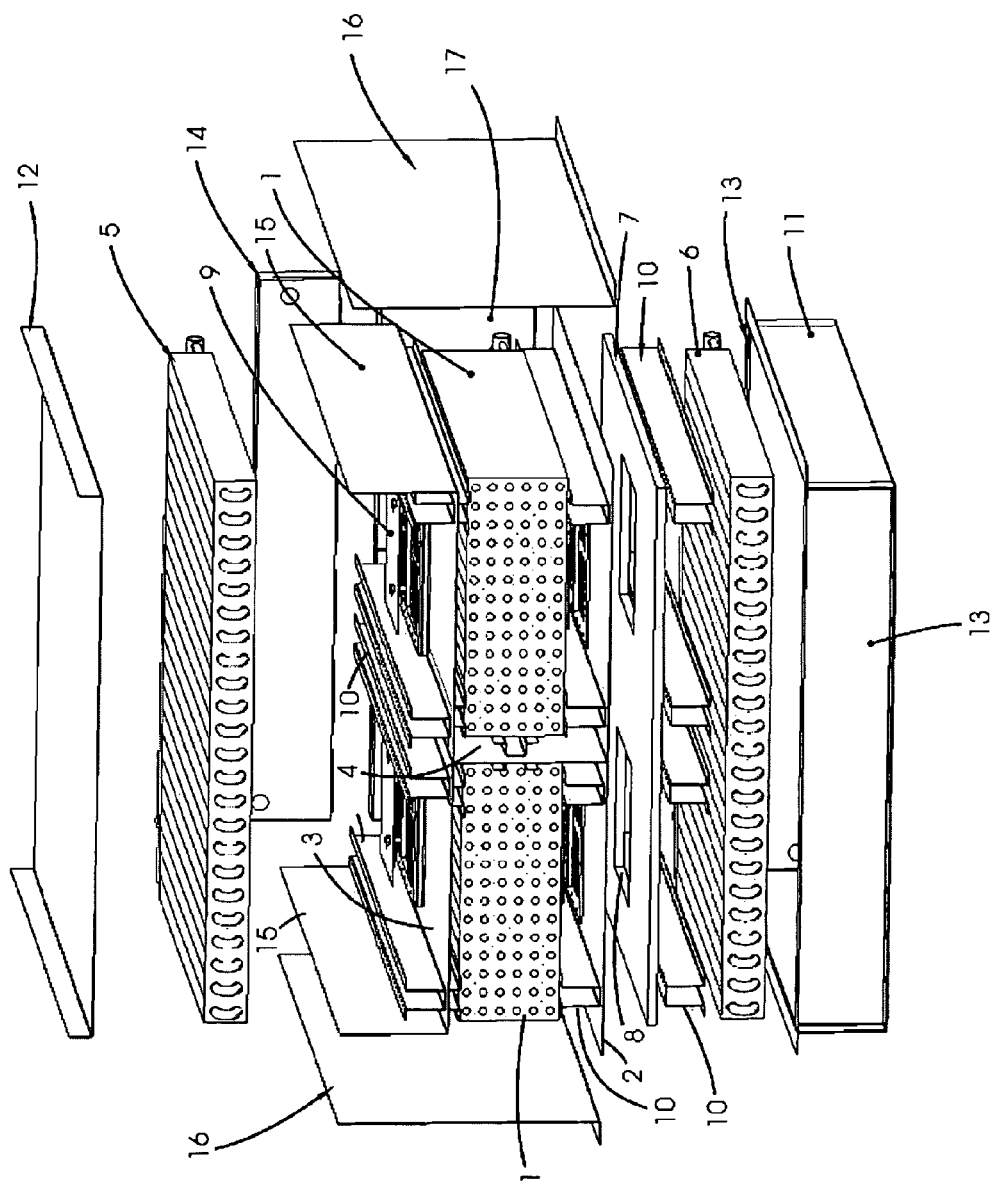

| | | | |
|---|---|---|---|
| 4,765,395 A * | 8/1988 | Paeye et al. | 165/104.12 |
| 4,881,376 A | 11/1989 | Yonezawa et al. | 62/106 |
| 5,161,389 A * | 11/1992 | Rockenfeller et al. | 62/480 |
| 5,249,436 A | 10/1993 | Hemsath | 62/476 |
| RE34,747 E * | 10/1994 | Petty et al. | 62/238.3 |
| 5,396,775 A * | 3/1995 | Rockenfeller et al. | 62/112 |
| 6,158,237 A * | 12/2000 | Riffat et al. | 62/484 |
| 6,442,951 B1 * | 9/2002 | Maeda et al. | 62/94 |
| 6,497,110 B2 * | 12/2002 | Davidson et al. | 62/259.2 |
| 6,526,776 B2 * | 3/2003 | Patzner | 62/480 |
| 6,595,022 B2 * | 7/2003 | Pokharna et al. | 62/480 |
| 6,837,766 B2 * | 1/2005 | Costello | 445/24 |
| 7,050,541 B2 * | 5/2006 | Bittl | 378/132 |
| 7,251,955 B2 * | 8/2007 | Henning | 62/480 |
| 7,434,411 B2 * | 10/2008 | Drost et al. | 62/101 |
| 2002/0046569 A1 * | 4/2002 | Faqih | 62/188 |
| 2003/0005721 A1 | 1/2003 | Sato et al. | 62/480 |
| 2005/0126211 A1 * | 6/2005 | Drost et al. | 62/476 |
| 2006/0101847 A1 * | 5/2006 | Henning | 62/480 |
| 2006/0277933 A1 * | 12/2006 | Smith et al. | 62/259.3 |

FOREIGN PATENT DOCUMENTS

| | | |
|---|---|---|
| DE | 102 17 443 | 11/2003 |
| EP | 1148305 | 10/2001 |
| WO | WO92/08934 | 5/1992 |
| WO | WO01/22010 | 3/2001 |
| WO | WO2005/108880 | 11/2005 |

* cited by examiner

COMPACT SORPTION COOLING UNIT

The invention relates to a compact sorption refrigeration device, comprising at least one adsorber/desorber unit having a heat exchanger and sorption material, at least one condenser heat exchanger and at least one evaporator heat exchanger, wherein these building blocks are located in a common, vacuum-tight metallic outer housing, and having connection and coupling elements and pipe ducts for the hydraulic interconnection and operation according to the preamble of patent claim 1.

According to DE 199 02 695 A1 sorption heat pumps, where adsorber/desorber heat exchangers are disposed together with an evaporator and a condenser in a common vacuum-tight receptacle, represent known prior art.

Moreover, a solid sorption heat pump comprising an adsorber/desorber unit having a heat exchanger and a solid sorption material is already known from the generic DE 102 17 443 B4, wherein this adsorber/desorber unit is disposed together with a condenser/evaporator unit in a common housing which is sealed against the outside atmosphere. According to this prior art, the adsorber/desorber unit and the condenser/evaporator unit are separated from one another by an adsorptive-permeable element.

In order to obtain according to DE 102 17 443 B4 a structure having a low heat capacity, the adsorber/desorber unit described therein comprises a thermoconductive absorbent holding body which is connected in a thermoconductive manner to the heat exchanger. Thus, the absorbent holding body fulfills two functions, that is, the heat transfer between the heat exchanger and the sorption material on the one hand, and the realization of a stable structure of the adsorber/desorber unit on the other hand. Such a stable structure allows the realization of the common housing with particularly thin walls because they need no longer provide the building block of the sorption heat pump with additional stability, but merely serve to seal the interior against the outside atmosphere.

According to the embodiment of the prior art described in DE 102 17 443 B4 the outer wall may be realized as a sheet metal sheathing that is placed on the adsorber/desorber unit or condenser/evaporator unit, respectively, or supported from the outside. In order to achieve a good insulation against the outside atmosphere the common housing may also be realized by means of a double shell, with a heat-insulating material being inserted into the interior space between the inner and the outer shell. As was mentioned before, the common housing described in the known prior art can be made of a thin sheet metal material which encases the individual elements. The mechanical stability of the sheet metal is ensured by supporting the edges of the heat exchanger in the region of pipe diverters. The adsorber/desorber unit and the condenser/evaporator unit are provided above each other and are separated from each other by the vapor-permeable element, e.g. realized in the form of a ceramic sponge. An evacuation nozzle is located on the housing, by means of which a negative pressure can be produced in the interior of the housing. The negative pressure makes the thin-walled sheet metal sheathing of the housing come into contact with a provided absorbent holding body, with the result that the forces generated by the negative pressure lead to a stabilization of the entire assembly.

As to the operating mode of a sorption heat pump and its operation in the individual phases reference be explicitly made to DE 102 17 443 B4.

On the basis of the foregoing it is the object of the invention to provide a further developed compact sorption refrigeration device, comprising at least one adsorber/desorber unit having a heat exchanger and sorption material as well as a condenser heat exchanger and an evaporator heat exchanger, which provides for a very high performance including high efficiency, and which can moreover be realized with a small construction space while the operation of the device to be provided is guaranteed as failure-free as possible over a long period of use.

The solution to the object of the invention is achieved with a compact sorption refrigeration device according to the combination of features defined in patent claim 1. Useful embodiments and further developments are defined in the dependent claims.

Accordingly, a compact sorption refrigeration device is provided, comprising at least one adsorber/desorber unit having a heat exchanger and sorption material, at least one condenser heat exchanger and at least one evaporator heat exchanger, wherein these building blocks are located in a common, vacuum-tight, preferably metallic outer housing. Moreover, connection and coupling elements as well as pipe ducts for the hydraulic interconnection and the operation of the device are provided on or in the housing.

According to the invention the sorption refrigeration device is realized as a sandwich structure, wherein the at least one adsorber/desorber unit is located in an inner or partial inner housing.

The condenser heat exchanger and the evaporator heat exchanger are spaced apart from each other and receive in the space between them the inner housing with the absorber/desorber unit.

The separating surfaces of the inner housing, which are directed towards the condenser heat exchanger and the evaporator heat exchanger, comprise steam valves.

In the region between the inner housing and the evaporator heat exchanger a heat-insulating layer or a heat-insulating board is disposed, which is provided with recesses in the region of the steam passage, i.e. in the region of the steam valves.

In a preferred embodiment profile material spacers are provided between the respective heat exchangers and the inner housing parts. Such profile material spacers can be easily fabricated from a metallic material in punching and bending steps, or can be obtained as standard profiles in the usual commercial manner.

Moreover, the positions of the heat exchangers and their spaced-apart orientation are definable by the dimensions of the profile material spacers.

In one embodiment of the invention the adsorber/desorber unit can comprise at least two adjacent heat exchangers having a sorption material, which are each located in a respective chamber, i.e. separated from each other, in the inner housing.

The separating surfaces of the inner housing are provided with recesses, with leaf valves being inserted in the recesses. These leaf valves serve the controlled passage of steam. The leaf valves are closed by an elastic valve material and as a result of gravity if there is no pressure difference. The valve material changes its position with respect to the recesses if a pressure difference exists between the upper and the lower side of the valve assembly.

In the opened state the respective leaf valves hit against a recess cover strip, which is spaced apart with respect to height from the respective separating surface and the recess provided therein. With respect to their surface dimension these recess cover strips may be larger than or equal to the dimension of the respective recess so as to achieve a protection for the leaf valve material.

The respective recesses may be rectangular or square and have a longitudinal or transverse web dividing the recess. The leaf valve can then be fixed to the respective transverse web.

The inner housing is partially closed, wherein its complete encapsulation is achieved with corresponding sections of the outer housing.

In another embodiment of the invention a siphon-type condensate return system is provided between the condenser heat exchanger and the evaporator heat exchanger.

This siphon-type condensate return system comprises a jacket pipe whose one end extends into a pressure compensation pot. Within the jacket pipe an open inner pipe is located. The free end of the inner pipe communicates via a flange with the condensate outlet nozzle of the condenser heat exchanger. Additional tubular connections are provided between the pressure compensation pot and the evaporator heat exchanger. The siphon condensate return system is located outside the sorption refrigeration device and is connected by vacuum-tight connecting means to the respective heat exchangers disposed in the interior of the sorption refrigeration device.

Figure 2:
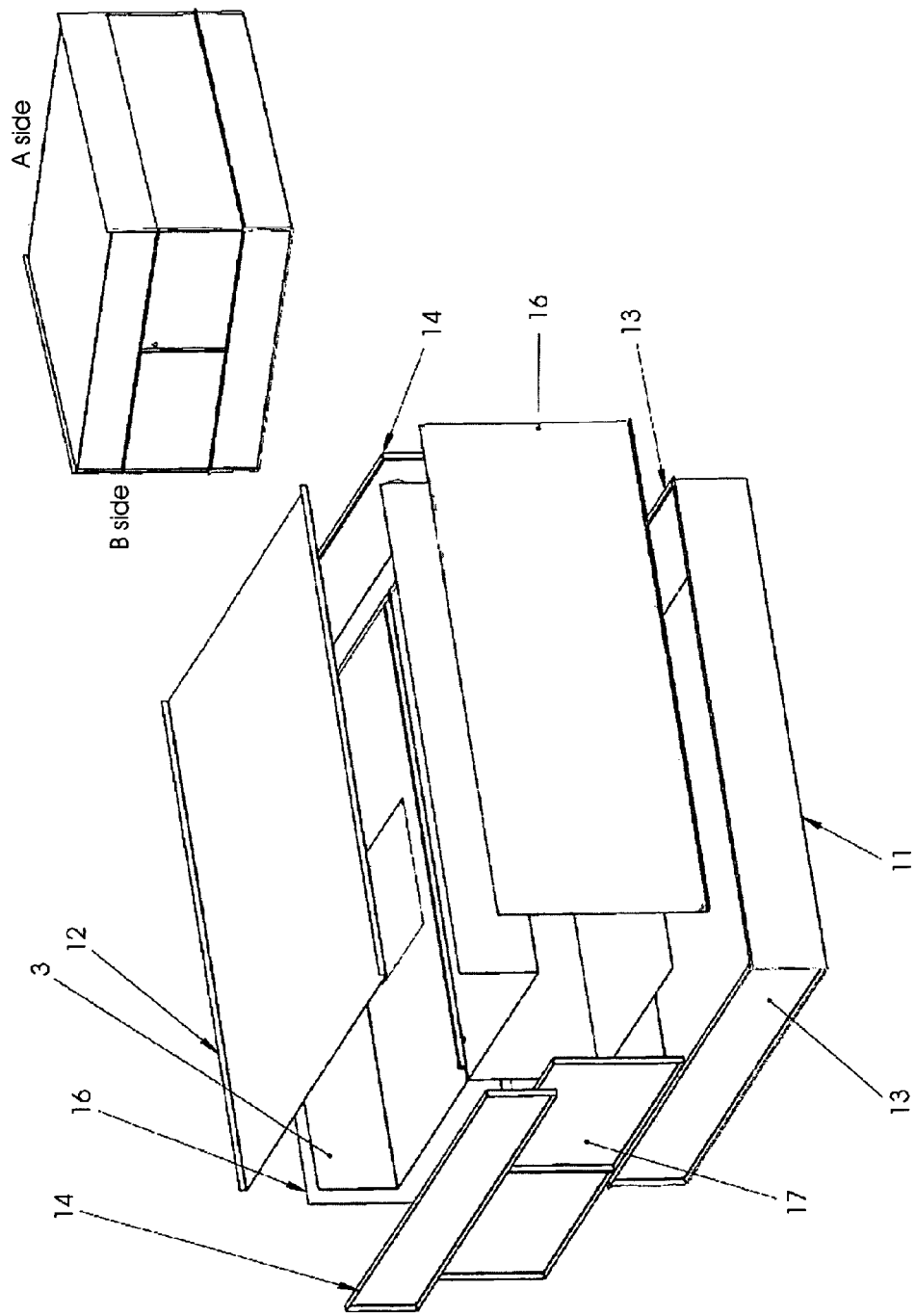
Figure 3:
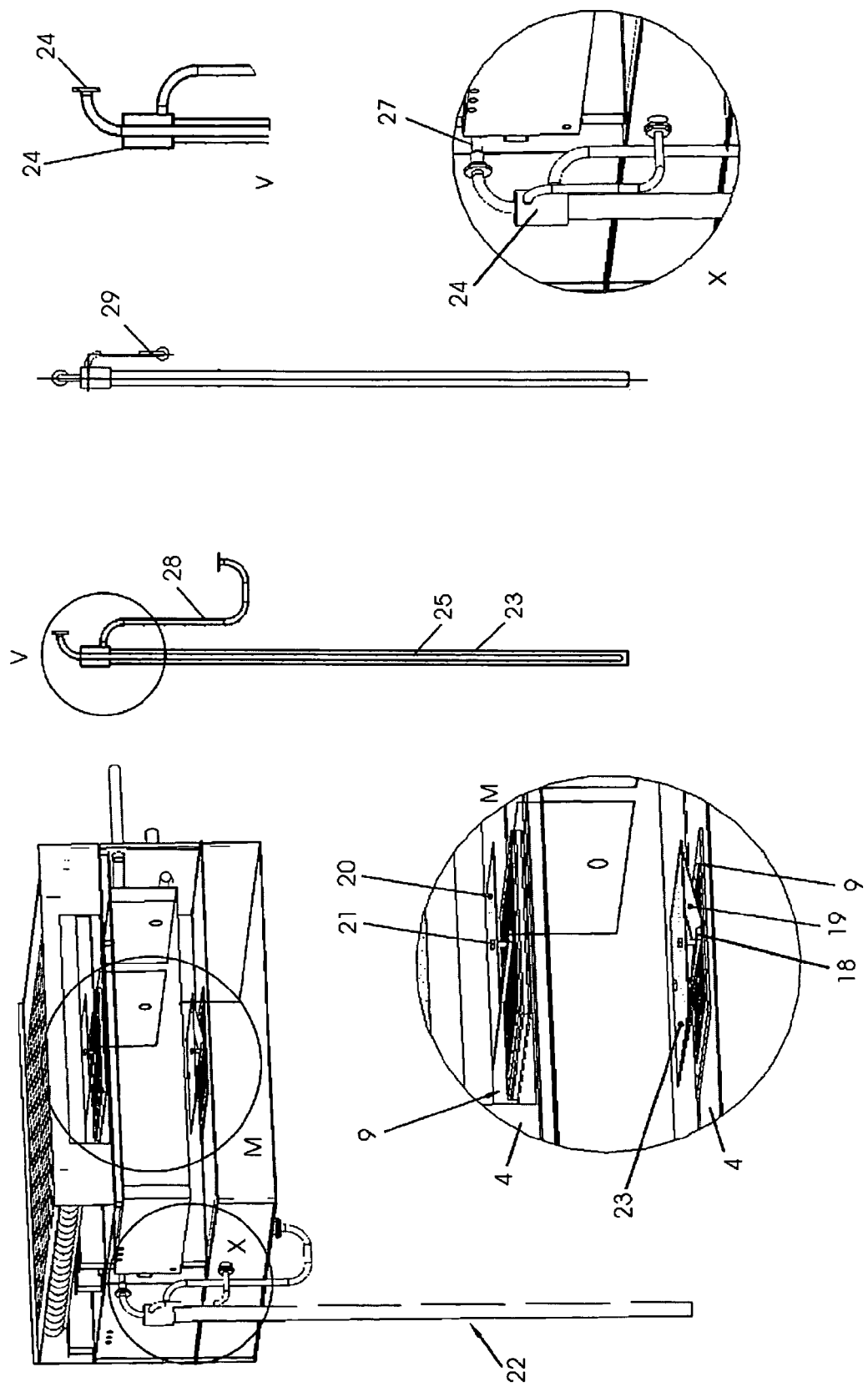

The invention shall be explained in more detail below by means of an embodiment and with reference to the figures. In the figures:

FIG. 1 shows an exploded view of the compact sorption refrigeration device according to the invention, with partial elements of the outer housing;

FIG. 2 shows a representation of the sheet metal casing for the sorption refrigeration device with elements of the inner housing, but without the heat exchangers illustrated in FIG. 1; and FIG. 3 shows a representation of the sorption refrigeration device, which is partially cut away with respect to the sheet metal casing, comprising a siphon condensate return system and a steam valve (detail M) as well as detail X with respect to the arrangement of the condensate return system and additional detailed representations of same.

The sorption refrigeration device illustrated in the figures is based on a sandwich structure.

Specifically, two adjacent adsorber/desorber units 1 are located inside an inner housing. The inner housing is comprised of a lower separating metal sheet 2 formed as a separating surface and of an upper separating metal sheet 3.

A separating metal sheet wall 4 is provided between the adsorber/desorber units 1.

The condenser heat exchanger 5 is located above the adsorber/desorber unit 1, and the evaporator heat exchanger 6 is located underneath unit 1.

A heat-insulating board 7 is located between the lower separating metal sheet 2 and the evaporator heat exchanger 6, said board comprising openings 8 which are substantially congruent with recesses in the lower separating metal sheet 2 which receive steam valves 9.

Between the respective heat exchangers and the parts of the inner housing profile material spacers 10 are provided, which guarantee a defined position of the building blocks of the sandwich structure on the one hand, and which increase the stability on the other hand.

A cover sheet plate 11, which is realized as a lower cover sheet plate, encloses the evaporator heat exchanger 6 and represents an element of the outer housing.

An upper cover sheet plate 12 analogously encloses the condenser heat exchanger 5 and likewise represents part of the outer housing (see FIG. 2).

Additional elements of the outer housing are insertable metal sheets 13 on both sides of the evaporator heat exchanger 6 as well as insertable metal sheets 14 on both sides of the condenser heat exchanger 5.

The inner housing for receiving the adsorber/desorber unit 1 comprises angled separating metal sheet sides 15, which are covered by lateral metal sheets 16 of the outer housing.

Furthermore, insertable metal sheets 17 are provided for the adsorber/desorber unit 1 which, in this case, represent an element of the outer and the inner housing.

The joints between the individual metal sheets are realized in the form of a lip-type seam and have the required tightness and mechanical stability.

The steam valves 9 realized as leaf valves shall be explained in more detail below with reference to the representation of FIG. 3, left-hand side, including detail M.

In recesses in the lower and the upper separating metal sheet 2; 3 a transverse web 18 is provided. An elastic leaf valve material 19 is fixed by means of the transverse web 18.

Depending on the pressure difference underneath and above the respective separating metal sheet 2; 3 the leaf valve material is either adjacent to the recess (representation according to FIG. 3, steam valve 9 closed) or opened if there is a pressure difference (see representation according to FIG. 3, bottom of detail M).

Above the respective recess a recess cover strip 20 is disposed in a spaced-apart manner.

This respective recess cover strip 20 protects, on the one hand, the leaf valve material 19, and forms a stop for the leaf valve material with respect to the height.

In one embodiment the respective recess cover strip 20 is fixed to the transverse web 18 by means of spacers formed by screws 21.

Moreover, according to the representation of FIG. 3, a siphon condensate return system 22 is located outside the closed housing of the sorption refrigeration device.

This siphon condensate return system 22 comprises a jacket pipe 23 whose lower end is closed.

On the upper end of the jacket pipe 23 a pressure compensation pot 24 (see detail V) is provided.

This pressure compensation pot 24 receives an inner pipe 25.

The outer free end of the inner pipe 25 can be connected to the condensate outlet nozzle 27 by a flange 26.

Moreover, tubular connections 28 and 29 are provided which, on the one hand (connection 29), serve to compensate the pressure towards the closed sorption refrigeration device and, on the other hand (28), the connection towards the evaporator heat exchanger 6.

LIST OF REFERENCE NUMBERS

1 adsorber/desorber unit
2 lower separating metal sheet
3 upper separating metal sheet
4 separating metal sheet wall
5 condenser heat exchanger
6 evaporator heat exchanger
7 heat-insulating board
8 opening
9 steam valve
10 spacer
11 lower cover sheet plate
12 upper cover sheet plate
13 insertable metal sheet evaporator
14 insertable metal sheet condenser
15 separating metal sheet sides 16 lateral metal sheet
17 insertable metal sheet for adsorber/desorber unit
18 transverse web
19 leaf valve material
20 cover strip
21 screw
22 siphon condensate return system
23 jacket pipe
24 pressure compensation pot
25 inner pipe
26 flange
27 condensate outlet nozzle
28; 29 tubular connection

The invention claimed is:

1. A compact sorption refrigeration device, comprising at least one adsorber/desorber unit having a heat exchanger and sorption material, at least one condenser heat exchanger and at least one evaporator heat exchanger, wherein these building blocks are located in a common, vacuum-tight metallic outer housing, and having connection and coupling elements and pipe ducts for the hydraulic interconnection and operation, characterized in that
a sandwich structure is provided, wherein the at least one adsorber/desorber unit is located in an inner or partial inner housing,
the condenser heat exchanger and the evaporator heat exchanger are spaced apart from each other and receive in the space between them the inner housing with the absorber/desorber unit,
the separating surfaces of the inner housing, which are directed towards the condenser heat exchanger and the evaporator heat exchanger, comprise steam valves, and in the region between the inner housing and the evaporator heat exchanger a heat-insulating layer or a heat-insulating board is disposed, and
the separating surfaces of the inner housing are provided with recesses, with leaf valves as steam valves being inserted in the recesses.

2. The sorption refrigeration device according to claim 1, characterized in that
profile material spacers are provided between the respective heat exchangers and the inner housing parts.

3. The sorption refrigeration device according to claim 2, characterized in that
the position of the heat exchangers relative to one another is definable by the dimensions of the profile material spacers.

4. The sorption refrigeration device according to claim 1, characterized in that
the adsorber/desorber unit comprises at least two adjacent heat exchangers having a sorption material, which are each located in a chamber in the inner housing.

5. The sorption refrigeration device according to claim 1, characterized in that
in the opened state the leaf valves hit against a recess cover strip, which is spaced apart with respect to height from the respective separating surface and the recess provided therein.

6. The sorption refrigeration device according to claim 1, characterized in that
the respective recess is rectangular or square and has a longitudinal or transverse web dividing the recess, with the leaf valve material being fixed to the respective web.

7. The sorption refrigeration device according to claim 1, characterized in that
the inner housing is partially closed, wherein its complete encapsulation is achieved with sections or parts of the outer housing.

8. The sorption refrigeration device according to claim 1, characterized in that
a siphon condensate return system is provided between the condenser heat exchanger and the evaporator heat exchanger.

9. The sorption refrigeration device according to claim 5, characterized in that
the respective recess is rectangular or square and has a longitudinal or transverse web dividing the recess, with the leaf valve material being fixed to the respective web.

10. A compact sorption refrigeration device, comprising at least one adsorber/desorber unit having a heat exchanger and sorption material, at least one condenser heat exchanger and at least one evaporator heat exchanger, wherein these building blocks are located in a common vacuum-tight metallic outer housing, and having connection and coupling elements and pipe ducts for the hydraulic interconnection and operation, characterized in that
a sandwich structure is provided, wherein the at least one adsorber/desorber unit is located in an inner or partial inner housing,
the condenser heat exchanger and the evaporator heat exchanger are spaced apart from each other and receive in the space between them the inner housing with the absorber/desorber unit,
the separating surfaces of the inner housing, which are directed towards the condenser heat exchanger and the evaporator heat exchanger, comprise steam valves, and in the region between the inner housing and the evaporator heat exchanger a heat-insulating layer or a heat-insulating board is disposed,
a siphon condensate return system is provided between the condenser heat exchanger and the evaporator heat exchanger, and
the siphon condensate return system comprises a jacket pipe whose one end extends into a pressure compensation pot, wherein within the jacket pipe an inner pipe is located whose free end communicates via a flange with the condensate outlet nozzle of the condenser heat exchanger, and that additional tubular connections are provided between the pressure compensation pot and the inner housing as well as the evaporator heat exchanger.

11. The sorption refrigeration device according to claim 10, characterized in that
the adsorber/desorber unit comprises at least two adjacent heat exchangers having a sorption material, which are each located in a chamber in the inner housing.

12. The sorption refrigeration device according to claim 10, characterized in that
the siphon condensate return system is located outside the sorption refrigeration device and is connected by vacuum-tight connecting means to the respective heat exchangers disposed in the interior of the sorption refrigeration device.

13. A compact sorption refrigeration device, comprising at least one adsorber/desorber unit having a heat exchanger and sorption material, at least one condenser heat exchanger and at least one evaporator heat exchanger, wherein these building blocks are located in a common, vacuum-tight metallic outer housing, and having connection and coupling elements and pipe ducts for the hydraulic interconnection and operation, characterized in that
a sandwich structure is provided, wherein the at least one adsorber/desorber unit is located in an inner or partial inner housing,
the condenser heat exchanger and the evaporator heat exchanger are spaced apart from each other and receive in the space between them the inner housing with the absorber/desorber unit,
the separating surfaces of the inner housing, which are directed towards the condenser heat exchanger and the evaporator heat exchanger, comprise steam valves, and in the region between the inner housing and the evaporator heat exchanger a heat-insulating layer or a heat-insulating board disposed,
a siphon condensate return system is provided between the condenser heat exchanger and the evaporator heat exchanger, and
the siphon condensate return system is located outside the sorption refrigeration device and is connected by vacuum-tight connecting means to the respective heat exchangers disposed in the interior of the sorption refrigeration device.

14. The sorption refrigeration device according to claim 13,
characterized in that
the adsorber/desorber unit comprises at least two adjacent heat exchangers having a sorption material, which are each located in a chamber in the inner housing.

15. A compact sorption refrigeration device, comprising at least one adsorber/desorber unit having a heat exchanger and sorption material, at least one condenser heat exchanger and at least one evaporator heat exchanger, wherein these building blocks are located in a common, vacuum-tight metallic outer housing, and having connection and coupling elements and pipe ducts for the hydraulic interconnection and operation,
characterized in that
a sandwich structure is provided, wherein the at least one adsorber/desorber unit is located in an inner or partial inner housing,
the condenser heat exchanger and the evaporator heat exchanger are spaced apart from each other and receive in the space between them the inner housing with the absorber/desorber unit,
the separating surfaces of the inner housing, which are directed towards the condenser heat exchanger and the evaporator heat exchanger, comprise steam valves, and in the region between the inner housing and the evaporator heat exchanger a heat-insulating layer or a heat-insulating board is disposed,
profile material spacers are provided between the respective heat exchangers and the inner housing parts, and
the separating surfaces of the inner housing are provided with recesses, with leaf valves as steam valves being inserted in the recesses.

16. The sorption refrigeration device according to claim 15,
characterized in that
the inner housing is partially closed, wherein its complete encapsulation is achieved with sections or parts of the outer housing.

17. A compact sorption refrigeration device, comprising at least one adsorber/desorber unit having a heat exchanger and sorption material, at least one condenser heat exchanger and at least one evaporator heat exchanger, wherein these building blocks are located in a common, vacuum-tight metallic outer housing, and having connection and coupling elements and pipe ducts for the hydraulic interconnection and operation,
characterized in that
a sandwich structure is provided, wherein the at least one adsorber/desorber unit is located in an inner or partial inner housing,
the condenser heat exchanger and the evaporator heat exchanger are spaced apart from each other and receive in the space between them the inner housing with the absorber/desorber unit,
the separating surfaces of the inner housing, which are directed towards the condenser heat exchanger and the evaporator heat exchanger, comprise steam valves, and in the region between the inner housing and the evaporator heat exchanger a heat-insulating layer or a heat-insulating board is disposed,
profile material spacers are provided between the respective heat exchangers and the inner housing parts,
the position of the heat exchangers relative to one another is definable by the dimensions of the profile material spacers, and
the separating surfaces of the inner housing are provided with recesses, with leaf valves as steam valves being inserted in the recesses.

18. The sorption refrigeration device according to claim 17,
characterized in that
the inner housing is partially closed, wherein its complete encapsulation is achieved with sections or parts of the outer housing.

19. A compact sorption refrigeration device, comprising at least one adsorber/desorber unit having a heat exchanger and sorption material, at least one condenser heat exchanger and at least one evaporator heat exchanger, wherein these building blocks are located in a common, vacuum-tight metallic outer housing, and having connection and coupling elements and pipe ducts for the hydraulic interconnection and operation,
characterized in that
a sandwich structure is provided, wherein the at least one adsorber/desorber unit is located in an inner or partial inner housing,
the condenser heat exchanger and the evaporator heat exchanger are spaced apart from each other and receive in the space between them the inner housing with the absorber/desorber unit,
the separating surfaces of the inner housing, which are directed towards the condenser heat exchanger and the evaporator heat exchanger, comprise steam valves, and in the region between the inner housing and the evaporator heat exchanger a heat-insulating layer or a heat-insulating board is disposed,
the adsorber/desorber unit comprises at least two adjacent heat exchangers having sorption material, which are each located in a chamber in the inner housing, and
the separating surfaces of the inner housing are provided with recesses, with leaf valves as steam valves being inserted in the recesses.

* * * * *